UNITED STATES PATENT OFFICE.

JOSEPH F. GENT, OF COLUMBUS, INDIANA, ASSIGNOR TO HIMSELF, GAFF, GENT & THOMAS, OF SAME PLACE.

PREPARED CEREAL.

SPECIFICATION forming part of Letters Patent No. 223,847, dated January 27, 1880.

Application filed September 1, 1879.

*To all whom it may concern:*

Be it known that I, JOSEPH F. GENT, of Columbus, in the county of Bartholomew and State of Indiana, have invented certain new and useful Improved Alimentary Products from Corn; and I do hereby declare the following to be a full, clear, and exact description of the invention, such as will enable others skilled in the art to which it appertains to make and use the same.

The object of my invention is to obtain from the cereal known by the several names of "corn," "Indian corn," and "maize" a new alimentary product, and to manufacture this new product in such a manner that it shall possess the quality of keeping in any climate.

To these ends the first part of my invention consists of the new product composed of dry flakes made from clipped and purified kernels of corn.

The second part of my invention consists of a compound process, the first step of which consists of the separation of the hulls and impurities from the kernels of corn by subjecting the corn to a dry clipping and cracking operation, and by separating the hulls and impurities from the heavier coarser portions by sifting and winnowing, or either of these operations, to obtain a purified granular product.

The second step of the process consists of the steaming of the granular product for the purposes of softening and toughening the granules without cooking the same.

The third step of the process consists of warm-rolling the soft and tough and wet granules for the purposes of rolling or pressing the granules into flakes and of drying and hardening the particles.

In order that my invention may be clearly understood, I will proceed to describe the process which I have successfully practiced for the production of the new product from corn.

The winnowed kernels of corn may be passed through a suitable mill to crack and hull them, and the cracked grits sifted or bolted to separate the hulls as effectually as practicable; or such kernels of corn may be passed through a cracking, hulling, and separating mill of any known kind, to hull, clip, and crack the kernels, as well as to separate the hulls and clipped portions from the granular cracked portions, at one operation. The purified granular material is then subjected to a steaming action in any suitable vessel, the steaming being continued long enough to effect a softening and toughening of the granules. The damp material (which may first be drained and otherwise treated to free it from the greater part of the condensed water) is then pressed and dried, so that the particles shall assume the form and quality of dry hard flakes. This drying and pressing I have effected successfully by passing the damp material through between warm rollers; but many other means for accomplishing this step of my compound process will readily suggest themselves to any one skilled in the art.

I am aware that corn has heretofore been hulled and granulated and steamed, and therefore claim neither of those processes; nor do I claim, broadly, a process consisting of the hulling and granulating and subsequent steaming of corn. I claim this compound process only when combined with the step of pressing and drying, as hereinbefore set forth, by which step my process is distinguished from any heretofore-known process for the treatment of corn, and the consequence of the practicing of which step in my new process is the production of the new article herein described.

What I claim as my invention, and desire to secure by Letters Patent, is—

1. As a new article of manufacture, the herein-described alimentary product from corn, which consists of hulled, dry, hard, uncooked flakes made from the kernels.

2. The process, substantially as herein set forth, of making dry hard flakes from hulled kernels of corn for the production of a new alimentary product, which process consists of the following steps, viz: first, crushing the corn in the dry state and separating the hulls therefrom; second, steaming the granular material to soften and toughen the particles without cooking the same; third, pressing and drying the particles to reduce them to dry hard flakes.

In testimony that I claim the foregoing I have hereunto set my hand this 30th day of August, 1879.

JOSEPH F. GENT.

Witnesses:
 THOMAS C. BURGESS,
 SAMUEL HARRIS.